Patented Jan. 11, 1944

2,339,047

UNITED STATES PATENT OFFICE 2,339,047

RECOVERY OF EXCESS GLYCERIN IN RESIDUES FROM THE PREPARATION OF MONO- AND DI-METHYL ETHERS OF GLYCEROL

William P. Bitler, Haverstraw, and Leonard Nicholl, Nyack, N. Y., assignors to Kay-Fries Chemicals, Inc., West Haverstraw, N. Y., a corporation of New York No Drawing. Application August 30, 1941, Serial No. 409,039

4 Claims. (Cl. 260—637)

This invention relates to improvements in the preparation of mono- and di-methyl ethers of glycerol, and more particularly to the recovery of glycerol from the reaction mixture.

Hitherto, in the preparation of the methyl ethers of glycerol, di-methyl sulphate is reacted with an anhydrous glycerol solution of sodium glycerate. During the reaction anhydrous sodium sulphate is precipitated in a practically amorphous form, in which form it is substantially impossible to filter. Furthermore, when the ether formed is distilled off from the reaction mixture, there is left a residue of unreacted glycerol and amorphous sodium sulphate, which residue cannot be conveniently separated into its components. As a result it has been necessary to discard the residual glycerol. This introduces a very appreciable cost item into the process, making it distinctly uneconomical.

It has now been found that glycerol may be recovered from such residues by conducting the reaction under conditions such that the sodium sulphate is either precipitated or transformed into a hydrous, crystalline, easily filterable form which is readily separated from the excess of glycerol and the latter economically recovered.

The improvements in the above described process may be carried out according to the following procedures:

(1) After the separation of the ethers, water is added to the residue in the proportion of one liter to the residue from 3,000 grams of glycerol. The aqueous mixture is then heated to 50-60° C. for one to one and one-half hours to convert the amorphous sodium sulphate into a definitely crystalline form. The resulting mixture is then susceptible of simple filtration so that the glycerol may be completely recovered from the filtrate by distilling off the water. A small additional amount of sodium sulphate may precipitate during the concentration, but this can be easily filtered off.

(2) The water to be added may be incorporated in the reaction mixture before the ethers are distilled off, and the mixture heated as described in Example 1. This heating changes the sodium sulphate over to the crystalline form. The sulphate is filtered off and the filtrate is fractionally distilled to successively remove water, ethers, and finally the glycerol.

(3) In the original reaction the glycerate solution, prepared from aqueous caustic soda and an excess of glycerol, may be left hydrous instead of being dehydrated. The reaction is then carried out in the usual manner and the sodium sulphate will precipitate in crystalline filterable form. In this particular procedure care must be taken to control the amount of water added so that the yield will not be cut down. After filtration of the sulphate residue the water and the ethers are successively distilled off leaving a residue of glycerol free from sodium sulphate, in which form it can be returned to the process for a subsequent run.

It will now be seen that colloidal suspensions of sodium sulphate formed in situ in the course of the reaction of sodium glycerate and di-methyl sulphate wherein methyl ethers of glycerol are the desired product, may be rendered separable by the addition of a controlled amount of water sufficient to convert the anhydrous sodium sulphate suspension into crystalline filterable form. It will be noted further that the required amount of water may be added at different stages of the process as by dilution of the completed reaction mixture; incorporation in the initial reagent; or by addition to the reaction mixture after withdrawal of the ethers formed.

It will now be appreciated that there has been disclosed a novel process for the economical recovery of glycerol from reaction mixtures of alkyl sulphate and alkali glycerates in glycerol wherein alkyl ethers of glycerol are formed and which are characterized by the formation of non-filterable, amorphous precipitates of anhydrous alkali sulphates, the features of novelty residing essentially in various methods of converting the amorphous, unfilterable sulphate residue to a crystalline, filterable form by the simple step of the addition of controlled amounts of water.

What is claimed is:

1. In the process of recovering excess glycerol resulting in a process of preparing methyl ethers wherein di-methyl sulphate and sodium glycerate are reacted in the presence of an excess of glycerol to form methyl ethers and a normally unfilterable, amorphous sodium sulphate-glycerol mixture, and the ethers formed are distilled off, the improvements comprising adding sufficient water to the distilland to convert the sodium sulphate to hydrated form, heating the mixture to crystallize the hydrated sulphate, filtering off the aqueous glycerol from the crystalline sulphate, and distilling off the water from the glycerol.

2. In the process of recovering excess glycerol resulting in a process for preparing methyl ethers wherein di-methyl sulphate and sodium glycerate are reacted in the presence of an excess of glycerol to form methyl ethers and a normally unfilterable, amorphous sodium sulphate-glycerol mixture, and the ethers formed are distilled off, the improvements comprising adding water in amount of 1 liter to each 3,000 grams of glycerol in the reaction mixture to convert the sodium sulphate to hydrated form, heating the mixture to crystallize the hydrated sulphate, filtering off the aqueous glycerol from the crystalline sulphate, and distilling off the water from the glycerol.

3. In the process of recovering excess glycerol resulting in a process for preparing methyl ethers wherein di-methyl sulphate and sodium glycerate are reacted in the presence of an excess of glycerol to form methyl ethers and a normally unfilterable, amorphous sodium sulphate-glycerol mixture is formed, the improvements comprising adding water to the reaction mixture in amount sufficient to hydrate the sodium sulphate, converting the anhydrous sodium sulphate into hydrated crystalline form by heating, filtering off the crystalline sulphate, and fractionally separating water, ethers and glycerol seriatim.

4. In the process claimed in claim 3, the method of fractionation comprising distillation.

WILLIAM P. BITLER.
LEONARD NICHOLL.